(12) United States Patent
Tsenter

(10) Patent No.: US 10,211,494 B1
(45) Date of Patent: Feb. 19, 2019

(54) LITHIUM HYDROGEN SECONDARY ELECTROCHEMICAL CELL

(71) Applicant: Boris Tsenter, Roswell, GA (US)

(72) Inventor: Boris Tsenter, Roswell, GA (US)

( * ) Notice: Subject to any disclaimer, the term of this patent is extended or adjusted under 35 U.S.C. 154(b) by 0 days.

(21) Appl. No.: 15/977,102

(22) Filed: May 11, 2018

Related U.S. Application Data

(60) Provisional application No. 62/606,997, filed on Oct. 16, 2017, provisional application No. 62/606,227, filed on Sep. 15, 2017.

(51) Int. Cl.
| | |
|---|---|
| *H01M 12/08* | (2006.01) |
| *H01M 4/38* | (2006.01) |
| *H01M 4/92* | (2006.01) |
| *H01M 8/18* | (2006.01) |
| *H01M 12/02* | (2006.01) |
| *H01M 16/00* | (2006.01) |
| *C25B 9/06* | (2006.01) |
| *C25B 1/04* | (2006.01) |
| *H01M 4/86* | (2006.01) |
| *H01M 4/02* | (2006.01) |

(52) U.S. Cl.
CPC .............. *H01M 12/08* (2013.01); *C25B 1/04* (2013.01); *C25B 9/06* (2013.01); *H01M 4/382* (2013.01); *H01M 4/926* (2013.01); *H01M 8/184* (2013.01); *H01M 12/02* (2013.01); *H01M 16/006* (2013.01); *H01M 2004/027* (2013.01); *H01M 2004/8689* (2013.01); *H01M 2300/0002* (2013.01)

(58) Field of Classification Search
CPC ...... H01M 12/00; H01M 12/02; H01M 12/08; H01M 16/006; H01M 2004/0027; H01M 2004/8689; H01M 2300/002; H01M 4/382; H01M 4/926; H01M 8/184; C25B 1/04; C25B 9/06
See application file for complete search history.

(56) References Cited

U.S. PATENT DOCUMENTS

| | | | |
|---|---|---|---|
| 3,669,744 A | 6/1972 | Tsenter et al. | |
| 5,376,475 A * | 12/1994 | Ovshinsky | ............ H01M 10/36 429/101 |
| 6,087,029 A | 7/2000 | Golovin et al. | |
| 7,344,804 B2 | 3/2008 | Klaassen | |
| 9,543,626 B2 | 1/2017 | Albertus | |
| 9,601,779 B2 | 3/2017 | Visco et al. | |
| 9,761,878 B2 | 9/2017 | Christensen et al. | |
| 9,831,503 B2 | 11/2017 | Sopchak | |
| 2003/0182792 A1* | 10/2003 | Katsumoto | ........... H01M 2/023 29/623.2 |
| 2010/0221596 A1* | 9/2010 | Huggins | ............... H01M 4/383 429/149 |
| 2013/0118913 A1* | 5/2013 | Vajo | ......................... C25B 1/02 205/639 |

* cited by examiner

*Primary Examiner* — Anca Eoff
(74) *Attorney, Agent, or Firm* — Meunier Carlin & Curfman LLC

(57) ABSTRACT

Disclosed herein are secondary electrochemical cells using lithium and hydrogen elements as active materials. In the process of charging hydrogen delivers electron to lithium, $Li^+$-ion simultaneously cross $Li^+$-ion conductive separator and deposits as metallic lithium or in matrix intercalated lithium. During discharge, Li delivers electron to proton of catholyte and moves as $Li^+$-ion across $Li^+$-ion conductive separator. Reversible fuel cells, water electrolyzers, metal hydrides or lithium itself can be used as sources of hydrogen.

20 Claims, 2 Drawing Sheets

LITHIUM HYDROGEN SECONDARY ELECTROCHEMICAL CELL

CROSS-REFERENCE TO RELATED APPLICATION

This application claims the benefit of U.S. Provisional Application 62/606,227, filed Sep. 15, 2017, and 62/606,997, filed Oct. 31, 2017, the contents of each are hereby incorporated in their entirety.

FIELD OF THE INVENTION

This fundamental invention is directed to autonomous power sources and particular to lithium hydrogen secondary electrochemical cells, lithium/hydrogen batteries, and systems including such cells and batteries with different sources of hydrogen including hydrogen produced by lithium discharging, water electrolyzers, and reversible fuel cells.

BACKGROUND

Lithium/oxygen, or lithium/air secondary batteries, has been explored as electrochemical cells. The theoretical specific energy of a lithium air battery is much higher than conventional lithium ion systems, estimated at over 40 MJ/kg, rendering it potentially useful in a wide number of settings. However, the primary product of the discharged battery, $Li_2O_2$, is insoluble in common electrolyte solvents. As such, lithium air systems are not suitable as secondary (i.e., rechargeable) systems. Moreover, the required presence of oxygen in the system presents the potential for unintended combustion.

There remains a need for improved secondary metal-gas batteries with high energy and robust rechargeability.

SUMMARY

Disclosed herein are lithium/hydrogen secondary electrochemical cells comprising from reversible lithium and hydrogen electrodes. Having specific energy equal 32 MJ/kg this chemistry is free from major disadvantages of lithium/air battery. Indeed, discharging lithium ion products are soluble in water, and the hydrogen inside of cell do not present as great a risk for unintended combustion. The hydrogen is consumed on hydrogen electrode during electrical charging and liberates electrons, which move to Li electrode. In process of discharging protons from electrolyte are reduced by the electrons and converted to gaseous hydrogen:

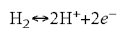

At the lithium electrode, lithium ions are consuming electrons deposing as Li metal during charging and are converted in $Li^+$ ions with liberating electrons during discharge:

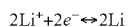

The overall electrochemical process may be written:

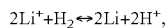

in which moving from left to right represents charging and moving right to left represents discharging modes. The hydrogen may be supplied in the gas phase or as an alloy, e.g., a metal hydride. When hydrogen gas is used, it may either be supplied from a storage means, generated on demand, for instance by chemical or electrochemical means like water electrolysis, or generated into a sealed battery housing under pressure in process of lithium electrode discharging. For non-sealed systems, the hydrogen gas generated during discharge may be externally vented or directed to a hydrogen electrode of reversible fuel cell.

The details of one or more embodiments are set forth in the descriptions below. Other features, objects, and advantages will be apparent from the description and from the claims.

DETAILED DESCRIPTION

Figure 1:
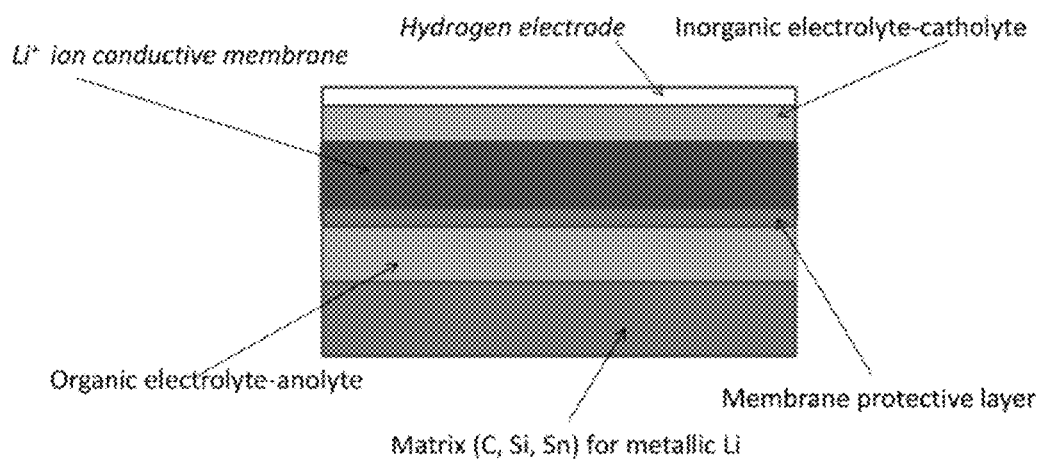
FIG. 1 depicts an electrochemical cell according to the present invention. The cell includes a hydrogen electrode in contact with a catholyte, followed by a lithium ion-permeable separator, an optional membrane protective layer, and anolyte in contact with a lithium electrode.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes ¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary"

means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Disclosed herein are Li—$H_2$ secondary electrochemical cells relying on the reversible conversion of hydrogen into protons and electrons. The cells include a hydrogen electrode, a lithium electrode, catholyte and anolyte systems, and lithium-ion permeable separator disposed between the hydrogen and lithium electrodes. In some embodiments, the secondary cells include at least one hydrogen supply in communication with the hydrogen electrode.

The hydrogen electrode can include one or more materials capable of interacting with hydrogen, either in gas or metallic form, and have a high surface area. Suitable materials include nickel matrices and carbonaceous materials such as graphite, carbon powder, pyrolytic carbon, carbon black, carbon fibers, carbon microfibers, carbon nanotubes (either single or multi-walled), fullerene carbons, graphene, other solid supports like alumina, silica, calcium carbonate, barium sulfate, as well combinations of any of the foregoing. Carbonaceous materials may have a specific surface area from 100-500 $m^2/g$. The hydrogen electrode can also include one or more hydrogen-active metallic catalysts, for instance platinum, palladium, nickel, ruthenium, iridium, rhodium, or cobalt. In some cases, the hydrogen electrode can be one or more of Pd/C, Pt/C, Ni/C, Ru/C, or Rh/C. The metal catalysts can be provided on the support in a range of from 0.1-10 $mg/cm^2$, relative to the geometric surface of the electrode. The true surface of electrode is in range of from 10-20 $m^2/g$ for catalyst and up to 100-500 $m^2/g$ for micro particles carbon carrier.

In some cases, the hydrogen electrode can include one or more metal absorbers or alloys. Exemplary alloys include $AB_5$, $AB_2$, and $A_2B_7$, in which A represents a strong hydride forming element and B represents a weak hydride forming element. In some embodiments, A can be Mg, La, or Zr, and B can be Ni or Co. Exemplary alloys include $LaNi_5$, $LaCo_5$, and $ZrNi_2$.

The lithium electrode can include one or more materials capable of intercalating lithium. In some embodiments, the lithium electrode can be lithium metal, optionally intercalated in porous matrix of carbon, silicon, or tin.

The hydrogen electrode and lithium electrode can each be in contact with a current collector, generally an electrically conductive but electrochemically inactive, metal. In various embodiments, the current collectors include copper, titanium, and/or alloys thereof for the lithium electrode. The current collector for the hydrogen electrode should be further inactive to the acidic or alkaline catholyte. Exemplary materials include those in use for acidic cells such as lead acid batteries, as well as those used in alkaline batteries.

The lithium ion permeable separator prevents contact between catholyte and anolyte, while simultaneously permitting lithium ions only to move freely between the lithium and hydrogen electrodes. Examples of the Li-conductive separator include, but are not limited to, porous films such as a polyethylene porous film and a polypropylene porous film, and non-woven fabrics such as a resin non-woven fabric and a glass non-woven fabric. Glass or glass ceramic separators may also be used, for instance lithium ion conductive glass ceramic separator (LICGC product) produced by Ohara Corp.

As used herein, the term catholyte refers to an electrolyte system suitable for the cathode, or hydrogen electrode. The term anolyte refers to an electrolyte system suitable for the anode, or lithium electrode. Exemplary catholytes include aqueous solvents, i.e., those including water. The aqueous solvent can be alkaline, for instance by including one or more bases such as an alkaline carbonate (LiOH, NaOH, KOH, $Li_2CO_3$, $Na_2CO_3$, or $K_2CO_3$). In other embodiments, the aqueous solvent can be acid, for instance by adding one or more mineral acids (HCl, HBr, HI, $H_2SO_4$, $H_3PO_4$, $HNO_3$). Preferably, the catholyte does not contain any organic solvent.

Exemplary anolytes include organic solvents, for instance ethylene carbonate (EC), propylene carbonate (PC), butylene carbonate (BC), dimethyl carbonate (DMC), diethyl carbonate (DEC), ethyl methyl carbonate (EMC), γ-butyrolactone, sulfolane, acetonitrile (AcN), dimethoxymethane, 1,2-dimethoxyethane (DME), 1,3-dimethoxypropane, diethyl ether, tetraethylene glycol dimethyl ether (TEGDME), tetrahydrofuran, 2-methyltetrahydrofuran, dimethylsulfoxide (DMSO) and mixtures thereof. Preferably, the anolyte does not include any aqueous solvent.

In some embodiments, the catholyte and/or anolyte may be a solid or gel. Polymers, for instance polyethylene oxide, polypropylene oxide, polyacrylonitrile, polyvinylidene fluoride (PVdF), polyurethane, polyacrylate or cellulose, can be added to the organic solvent to give a gel electrolyte. In some instances, ionic liquids, solid polymers and/or solid ceramics may also be used as either the anolyte or catholyte.

The lithium ion for organic solvent may be provided in the form of lithium salts. Suitable lithium salts include $LiClO_4$, $LiPF_6$, $LiBF_4$, lithium(trifluoromethyl-sulfonyl)imide, lithium, bis(perfluoroethylsulfonyl)imide, lithium bis(oxalato)borate, and combinations thereof. The lithium salt may be present at a concentration from 0.5 M to 1.5 M.

Figure 2:
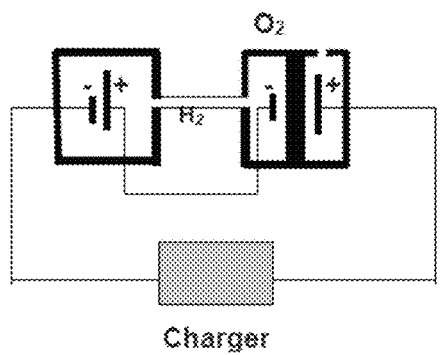
FIG. 2 depicts a combination of an electrochemical cell connected in series with a water electrolyzer. Supplying energy to the system via the charger generates hydrogen on the cathode of water electrolyzer, which is supplied to the hydrogen electrode of the charging Li—$H_2$ cell via a manifold.

The electrochemical cell can also include a hydrogen manifold, which supplies hydrogen to the hydrogen electrode. In certain embodiments, hydrogen is provided as a gas from a compressed tank, or dedicated supply (i.e., stationary source) which reversibly couples to the hydrogen manifold and can be detached upon completion of the hydrogen delivery. In other embodiments, the hydrogen manifold is in communication with a water electrolyzer. For embodiments in which multiple cells are arranged in parallel or series, the same electrolyzer can supply hydrogen gas to each individual cell, or each cell can be coupled with its own electrolyzer. The electrolyzer preferably has a non-reversible hydrogen electrode, meaning that while the electrolyzer will consume electricity to split water into oxygen and hydrogen, it will not combine hydrogen and oxygen into water. The electrolyzer can be linked in series with the Li—$H_2$ secondary cell (FIG. 2), such that supplying energy to the system generates hydrogen gas and charges the Li—$H_2$ secondary cell. In this case number of series connected lithium hydrogen cells should be equal to number of series connected electrolyzers.

Figure 3:
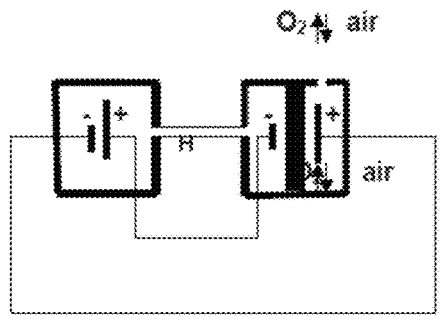
FIG. 3 depicts a combination of an electrochemical cell connected in series with a reversible fuel cell. Hydrogen produced during discharge of the Li—$H_2$ cell is supplied to the hydrogen electrode of reversible fuel cell via a manifold. In process of charging hydrogen electrode of reversible fuel cell generates hydrogen, which move to hydrogen electrode of Li—$H_2$ battery.
Figure 4:
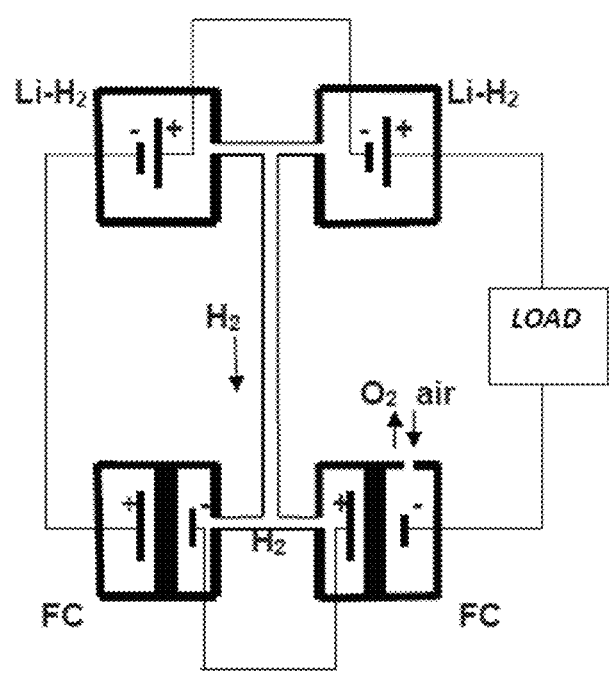
FIG. 4 depicts a combination of two electrochemical cells connected in series with two reversible fuel cells. The hydrogen produced during discharge of Li—$H_2$ cells supplied to the hydrogen electrode of reversible fuel cells via a central manifold.

Because the discharge of the electrochemical cell produces hydrogen gas, the hydrogen manifold can be coupled with a reversible fuel cell. The reversible fuel cell can be a proton exchange membrane fuel cell or an alkaline or acid reversible fuel cell, or solid electrolyte fuel cell. The electrical energy generated by the reversible fuel cell augments the electrical energy produced by Li—$H_2$ battery discharge. In particular, if the discharge voltage of Li—$H_2$ cell is 2.7V and discharge voltage of reversible fuel cell is 0.7V, the total output voltage from series connected secondary cell and reversible fuel cell will be 3.4V. The electrochemical cell and reversible fuel cell can be arranged in series in order to increase the overall voltage produced by the system (FIG. 3). In particular, the reversible fuel cell hydrogen electrode can be in electrical communication with the hydrogen electrode of Li—$H_2$ battery, and the reversible fuel cell air electrode can be in electrical communication with the lithium electrode. In certain embodiments, a system of multiple Li—$H_2$ cells and multiple fuel cells can be arranged in series, thereby increasing the overall output of the system (FIG. 4). The number of electrochemical and fuel cells that can be combined is not particularly limited; for instance, at least 2, at least 3, at least 4, at least 5, at least 6, at least 7, at least 8, at least 9, or at least 10 such cell can be combined. In some embodiments, the manifold of each electrochemical cell converges to a single line, which delivers hydrogen gas to hydrogen electrode of each fuel cell. In other embodiments, a single electrochemical cell manifold is in communication with a hydrogen electrode of single reversible fuel cell.

The electrochemical secondary cells disclosed herein exhibit substantially reduced fade over charge/discharge cycles. For example, the secondary cells disclosed herein can lose no more than 20%, over 700 charge/discharge cycles. Preferably no more than 20% fade is observed over 700 charge/discharge cycles.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A secondary lithium-hydrogen electrochemical cell comprising:
    a) a reversible hydrogen electrode in contact with a catholyte, wherein the hydrogen electrode is in communication with a hydrogen supply;
    b) a reversible lithium electrode in contact with an anolyte, wherein the anolyte does not include any aqueous solvent;
    c) a lithium salt; and
    d) a $Li^+$-ion permeable separator disposed between the catholyte and anolyte.

2. The lithium-hydrogen electrochemical cell of claim 1, wherein the lithium electrode comprises metallic lithium or lithium intercalated in a matrix comprising silicon, tin, or carbon.

3. The lithium-hydrogen electrochemical cell of claim 1, wherein the hydrogen electrode comprises a metallic catalyst supported by a carbonaceous material, or a hydrogen absorbing alloy.

4. The lithium-hydrogen electrochemical cell of claim 1, wherein the hydrogen electrode comprises Pd/C, Pt/C, Ni/C, Ru/C, or Rh/C.

5. The lithium-hydrogen electrochemical cell of claim 1, wherein the hydrogen electrode comprises a hydrogen adsorbing alloy having the formula $AB_5$, $AB_2$, and $A_2B_7$, wherein A comprises at least one of Mg or La, and B comprises Ni.

6. The lithium-hydrogen electrochemical cell of claim 5 wherein the cell is sealed with lithium electrode in charging mode and metal alloy in hydrogen desorbed mode or lithium electrode in discharged mode and metal alloy in hydrogen adsorbed mode.

7. The lithium-hydrogen electrochemical cell of claim 1 wherein a source of hydrogen for battery charging is hydrogen generated under pressure inside a sealed housing in process of discharging, wherein the hydrogen pressure rises linearly with the cell's delivered discharging capacity.

8. Lithium-hydrogen electrochemical cell of claim 7, wherein the cell is sealed with regard to the lithium electrode in charging mode.

9. The lithium-hydrogen electrochemical cell of claim 1, wherein the lithium ion is deposited on the lithium electrode during charging and released during discharging.

10. The lithium-hydrogen electrochemical cell of claim 1, wherein the catholyte comprises an aqueous solvent.

11. The lithium-hydrogen electrochemical cell of claim 1, wherein the lithium salt comprises $LiClO_4$, $LiPF_6$, $LiBF_4$, lithium(trifluoromethyl-sulfonyl)imide, lithium bis(perfluoroethylsulfonyl) imide, lithium bis(oxalato)borate, or a combination thereof.

12. The lithium-hydrogen electrochemical cell of claim 1, wherein the hydrogen supply is in communication with the cathode of least one water electrolyzer.

13. The lithium-hydrogen electrochemical cell of claim 12, wherein the electrochemical cell is connected in series with the water electrolyzer, and the number of lithium-hydrogen cells is equal to number of electrolyzers.

14. The lithium-hydrogen secondary electrochemical cell of claim 1, wherein the hydrogen supply is in communication with the negative electrode of least one reversible fuel cell.

15. The lithium-hydrogen secondary electrochemical cell of claim 14 wherein the negative electrode of the reversible fuel cell is connected to the hydrogen electrode of lithium hydrogen cell and the lithium electrode of the lithium hydrogen cell is connected to the positive electrode of the reversible fuel cell.

16. The lithium-hydrogen secondary electrochemical cell of claim 14, wherein the reversible fuel cell is a proton exchange membrane reversible fuel cell, an alkaline reversible fuel cell, an acid reversible fuel cell, or solid electrolyte reversible fuel cell.

17. A battery comprising a plurality of the lithium-hydrogen secondary electrochemical cell of claim 1, wherein the cells are connected in parallel and series and have a common hydrogen manifold.

18. The battery of claim 17, exhibiting no more than 20% capacity loss over 700 charge/discharge cycles.

19. The battery of claim 17, wherein the hydrogen supply is in communication with at least one reversible fuel cell.

20. The battery of claim 19, wherein the number of series-connected fuel cells is equal to number of series connected lithium-hydrogen cells.

* * * * *